3,160,557
METHOD OF PRODUCING ANTI-TUSSIVE ACTION WITH 2 - ALLYLOXY - BENZOIC ACID DERIVATIVES
Roland-Yves Mauvernay, Riom, France, assignor to Centre Européen de Recherches Mauvernay, Chateau de Bardon, Riom, Puy-de-Dome, France
No Drawing. Filed Sept. 27, 1962, Ser. No. 227,656
Claims priority, application France, May 5, 1962, 896,591; June 25, 1962, 901,887
3 Claims. (Cl. 167—55)

The present invention relates to new 2-allyloxy-benzoic acid derivatives, and more particularly to 4-chloro-2-allyloxy-benzoic acid derivatives which have important pharmacological activity, particularly as anti-tussives.

It is an object of the present invention to provide new anti-tussive compounds.

It is a further object of the present invention to provide new 2-allyloxy-benzoic acid derivatives which have a high degree of activity as anti-tussives comparative to the anti-tussive action of codein without being a drug of addiction and while having a much lower toxicity.

It is yet another object of the present invention to provide for the production of the new compounds of this invention.

It is still another object of the present invention to provide compositions containing the compounds of the present invention for anti-tussive purposes, and also to provide for the use of the compounds of the present invention to achieve an anti-tussive action.

Other objects and advantages of the present invention will be apparent from a further reading of the specification and of the appended claims.

With the above and other objects in view, the present invention mainly comprises a compound selected from the group consisting of compounds of the formula:

Cl—⟨ ⟩—CO—R
       |
       O—CH₂—CH=CH₂ wherein R is selected from the group consisting of

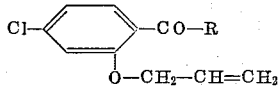

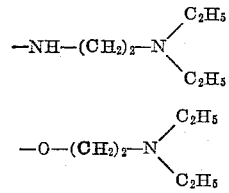

and

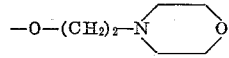

and non-toxic physiologically compatible acid addition salts thereof.

The most preferred anti-tussive compound of the present invention is 4-chloro-2-allyloxy-4-N-(β-diethylaminoethyl)-benzamide of the following structural formula:

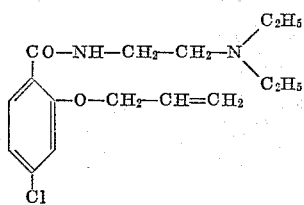

and the most preferred acid addition salt is of the hydrochloride. It should be noted that other acid addition salts than the hydrochloride may be used for the purposes of the present invention, the hydrochloride being preferred for reasons of economy, ready availability and compatibility at least equal to any of the other acid addition salts.

The compounds of the present invention may be mixed with any normal pharmaceutical carrier, either for per-oral administration or for injection, utilizing an anti-tussive effective amount of the compound, which amount is relatively low, for example as low as 12.5 mg./kg., a dose of 25 mg./kg. being sufficient to effect complete relief from the cough.

The compounds of the present invention may be produced according to the following equations:

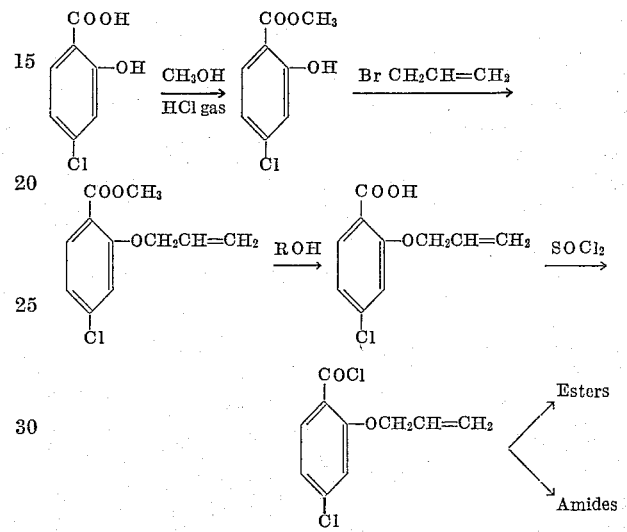

Thus, in accordance with the present invention 2-hydroxy-4-chloro-benzoic acid is reacted with methanol to form the corresponding methyl benzoate which is then reacted with an allyl halide such as allyl bromide to form the corresponding 2-allyloxy-4-chloro-methyl benzoate. This latter compound is then reacted with thionyl chloride to form the corresponding 2-allyloxy-4-chloro-benzoyl chloride, which compound may then be amidated with β-diethylaminoethyl amine to form the corresponding benzamide wherein R is

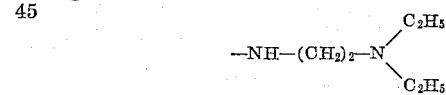

on the other hand, the benzoyl chloride may be esterified with β-diethylaminoethanol to form the corresponding ester wherein R is

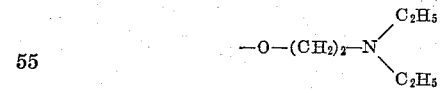

or with morpholinoethanol to form the corresponding ester wherein R is

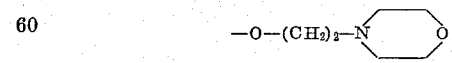

The following example is given to further illustrate the method of the present invention. The scope of the invention is not, however, meant to be limited to the specific details of the example.

EXAMPLE (a) *The Production of 2-Hydroxy-4-Chloro-Methyl Benzoate*

200 g. of 2-hydroxy-4-chloro benzoic acid and 1 liter of methanol are brought to reflux. Dry hydrogen chloride gas is bubbled through the mixture during a time period of 8 hours. The excess of methanol is evaporated, the residue is poured into cold water, neutralized and extracted with ether. After evaporation of the solvent the product is distilled under vacuum. The boiling point of the compound at 15 mm. Hg is 127° C., and the yield is 85% of the theoretical.

(b) *The Production of 2-Allyloxy-4-Chloro-Methyl Benzoate*

The following mixture is heated to refluxing under agitation:

| | |
|---|---|
| 4-chloro-2-hydroxy-methyl benzoate (1 mol) __g__ | 186.5 |
| Acetone _____cc__ | 350 |
| Anhydrous potassium carbonate _____g__ | 152 |
| Redistilled allyl bromide _____g__ | 133 |

At the end of 6 hours the reaction is completed. The reaction mixture is filtered for removal of the mineral salts. The acetone is evaporated. There is thus obtained an oily residue which rapidly crystallizes. After recrystallization from methanol the product which is obtained is a well crystallized white product which melts at 56° C. The yield is 84%.

(c) *The Production of 2-Allyloxy-4-Chloro-Benzoyl Chloride*

The 2-allyloxy-4-chloro-methyl benzoate obtained under (b) above is saponified under the usual conditions for obtaining the corresponding acid, and the corresponding acid is obtained in a yield of 91%, the acid melting at 87° C.

The chloride of the acid is prepared by treating 1 mol of the acid with 1.5 mols of thionyl chloride (freshly rectified on linseed oil) in the presence of benzene. There is thus obtained a pale yellow viscous liquid which can be further used without preliminary distillation.

(d) *Preparation of the Amide and of the Hydrochloride*

115.5 g. (0.5 mol) of the benzoyl chloride produced under (c) above is dissolved in 500 cc. of anhydrous chloroform. There is added to this solution drop by drop while agitating and under cooling in an ice bath 116 g. of β-diethylaminoethylamine. After the addition is completed the agitation is continued for 1 hour at ambient temperature. The reaction mass is then washed with water, the chloroform is evaporated, the residue is taken up the minimum of absolute alcohol, and there is then added a slight excess of absolute alcohol saturated with hydrogen chloride. The hydrochloride crystallizes by the addition of anhydrous ether. After recrystallization in absolute alcohol plus ether there is obtained white crystals which are soluble in water and in alcohol. The 2-allyloxy-4-chloro-N-(β - diethylaminoethyl) - benzamide - hydrochloride melts at 125–127° C.

The esterification of the 2-allyloxy-4-chloro-benzoyl chloride with β-diethylamino ethanol or morpholino ethanol may be accomplished in normal manner and the hydrochloride or other acid addition product may also be produced in normal manner similar to the above production of the amide and its hydrochloride.

As indicated above, the compounds of the present invention are anti-tussive compounds which are unrelated to the morphines and their derivatives. Studies have shown that these compounds in comparison to codein phosphate possess a considerably lower toxicity while having an important anti-tussive action without any depressive action on the central respiratory system and without any depressive action on intestinal motility. In addition, these compounds have an anti-histaminic activity without having any notable deleterious side effects.

The following test results carried out on 2-allyloxy-4-chloro-N-(β-diethylaminoethyl)-benzamide and comparing the same with codein illustrates the superior properties of the compounds of the invention.

In the further discussion of pharmacological tests which follows below the compound of the present invention which was tested was 2-allyloxy-4-chloro-N-(β-diethylaminoethyl)-benzamide-hydrochloride, and for convenience this compound will in the further discussion which follows be referred to as 264 C.E.

The $LD_{50}$ on mice was determined by the method of Behrens and Karber. The product tested was administered in increasing doses on lots of 6 animals which were then observed for 48 hours. Under these conditions it was found that the $LD_{50}$, intravenously, of the compound is 61 mg./kg. with appearance of first deaths at between 50 and 55 mg./kg. The $LD_{50}$ upon peroral administration is 740 mg./kg. with appearance of the first deaths at between 250 and 400 mg./kg. (one death in six occurring at 400 mg./kg.).

The $LD_{50}$ of codein (phosphate) upon oral administration to mice varies, according to different authors, at between 470 and 650 mg./kg. However, the $LD_{50}$ upon intravenous administration is 110 mg./kg.

The anti-tussive action was determined by the technique of Domenjoz by electrical excitation of the superior laryngeal nerve of the cat. The product was administered intraduodeneally with increasing doses. It was found that at a dose of 12.5 mg./kg. the action of 264 C.E. is clear but irregular. At a dose of 25 mg./kg. its action is marked with complete abolition of the cough.

This anti-tussive action, which starts 5 to 10 minutes after administration of the compound, persists for about 1 hour and is not accompanied by any respiratory depression.

Codein phosphate, under the same experimental conditions, possesses a comparable anti-tussive action at a dose of 5 mg./kg. upon intraduodenal administration, but it is necessary to increase the dose to 19 mg./kg. intraduodenally to regularly obtain a complete abolition of the cough. Most important, its anti-tussive action is accompanied with a considerable reduction in the respiratory rhythm.

The anti-histamine action was determined by two methods: the technique of Magnus on the terminal ileon of guinea pigs and by a modified Konzett technique on anesthetized guinea pigs studying the histaminic bronchoconstruction. Both methods showed 264 C.E. to have an anti-histaminic action.

Of great importance it was determined that 264 C.E. does not cause any modification of the intestinal peristalsis, contrary to codein and other morphine derivatives. Compositions containing the active agents of the present invention can be prepared in the form of liquids, for example syrups, tablets, dragees, suppositories and the like. In the case of liquids the concentration of active ingredient is most preferably 1 g. per liter, with the dosage being 3 to 4 tablespoons per day. In the case of tablets, using normal pharmaceutical excipients each tablet contains 25 to 50 mg., with the dosage being 1 to 6 tablets per day. Suppositories may be prepared with 10, 25 or 50 mg. of active ingredient per suppository, the dosage being 1 to 2 suppositories per 24 hours.

Without further analysis, the foregoing will so fully reveal the gist of the present invention that others can by applying current knowledge readily adapt it for various applications without omitting features that, form the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. The method of achieving an anti-tussive action which comprises administering to a patient requiring the same a compound selected from the group consisting of compounds of the formula:

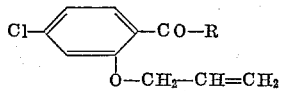

wherein R is selected from the group consisting of

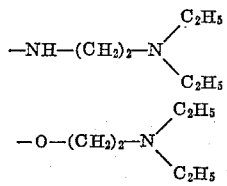

and

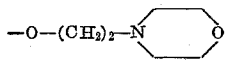

and non-toxic, physiologically compatible acid addition salts thereof.

2. The method of achieving an anti-tussive action which comprises administering to a patient requiring the same 2-allyloxy-4-chloro-N-($\beta$-diethylaminoethyl)-benzamide.

3. The method of achieving an anti-tussive action which comprises administering to a patient requiring the same 2-allyloxy-4-chloro-N-($\beta$-diethylaminoethyl) - benzamide-hydrochloride.

References Cited in the file of this patent

UNITED STATES PATENTS

| | | |
|---|---|---|
| 2,694,088 | Sahyun et al. | Nov. 9, 1954 |
| 2,895,992 | Ohnacker et al. | July 21, 1959 |
| 2,937,118 | Von Haxthausen et al. | May 17, 1960 |
| 3,063,902 | Gray et al. | Nov. 13, 1962 |
| 3,070,628 | Lemin | Dec. 25, 1962 |